Oct. 10, 1967  W. E. FEE  3,346,313
FISHING TACKLE BOX
Filed March 5, 1965  3 Sheets-Sheet 1
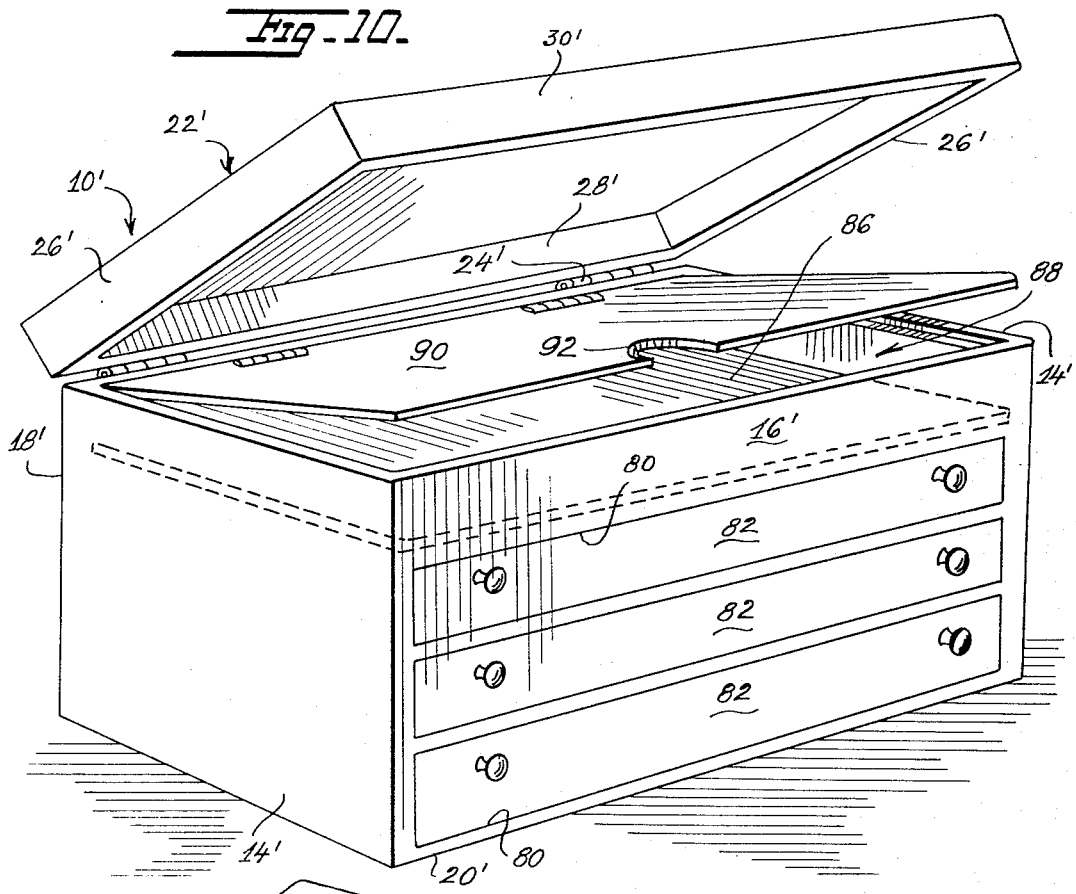
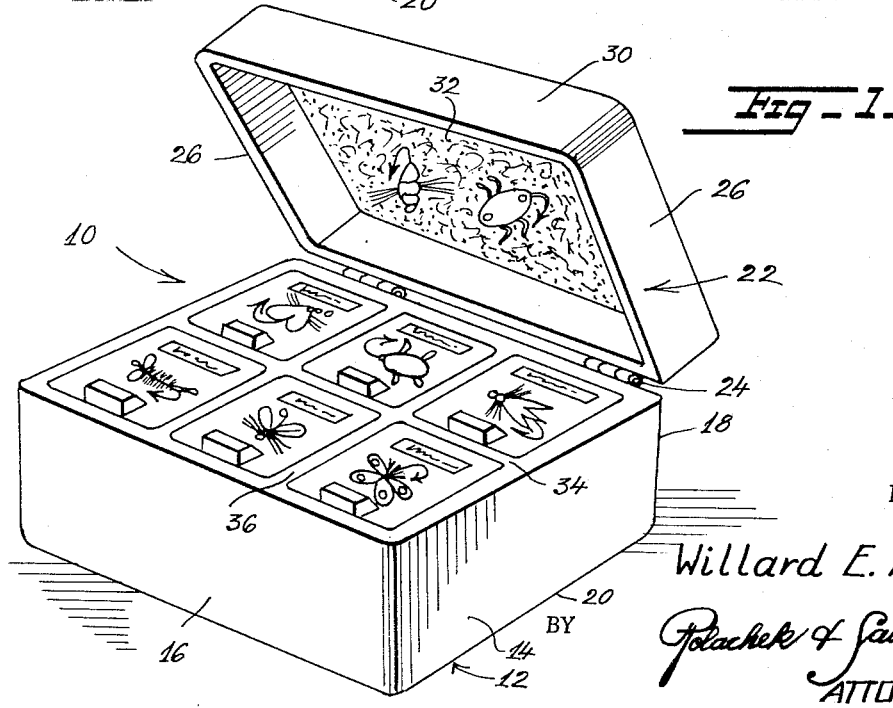
INVENTOR
*Willard E. Fee*
BY *Polachek & Saulsbury*
ATTORNEYS.

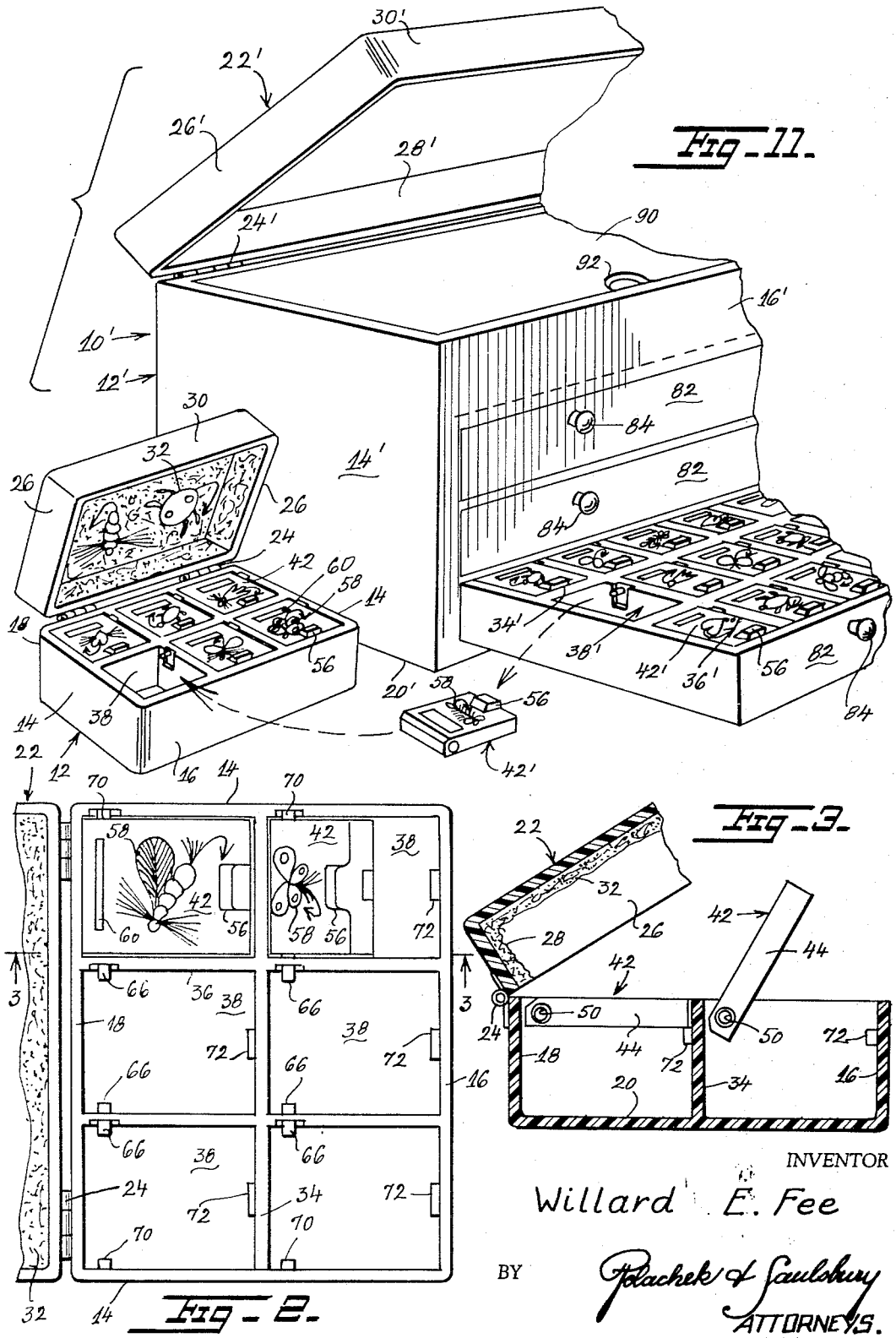

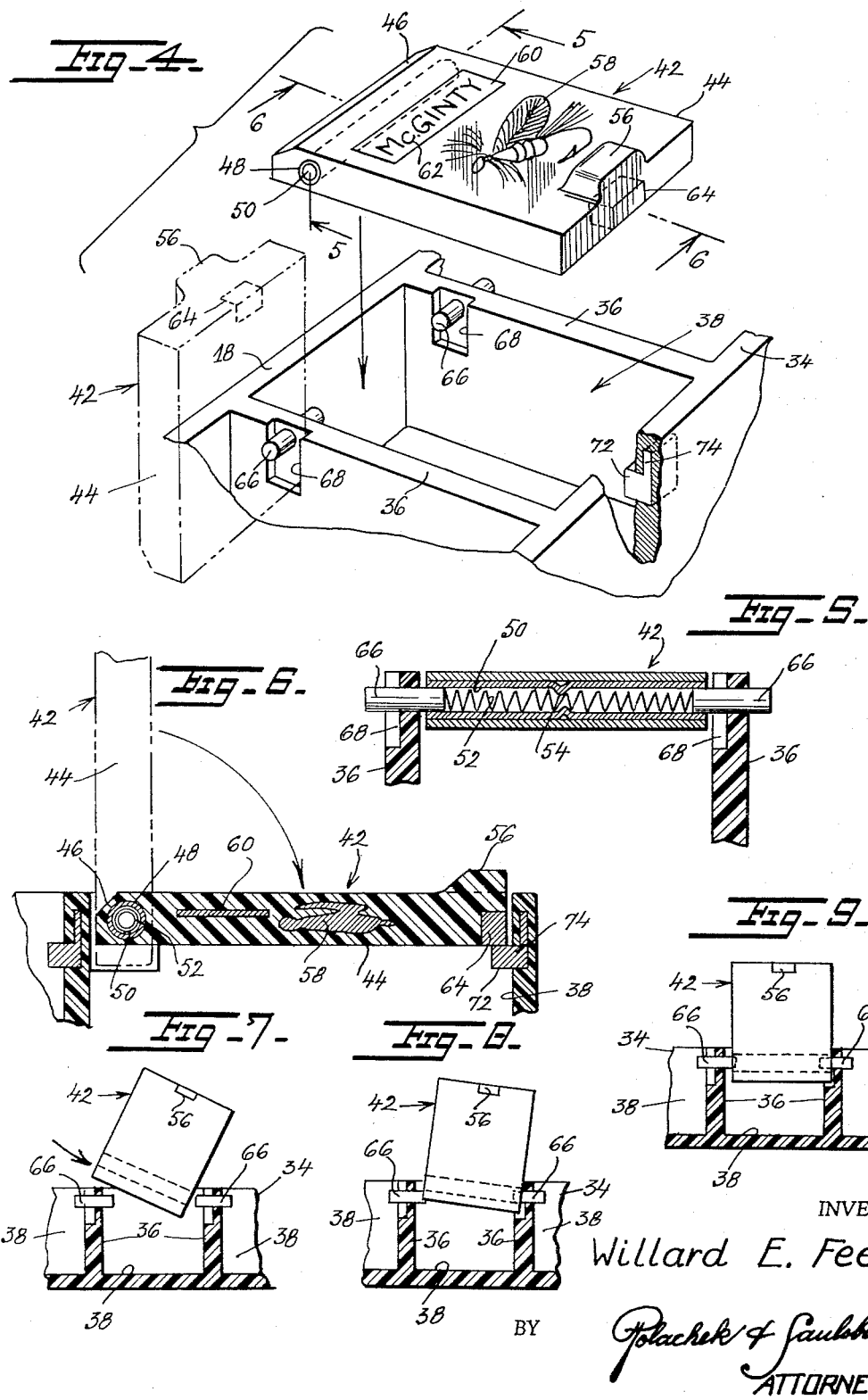

United States Patent Office 3,346,313
Patented Oct. 10, 1967

3,346,313
FISHING TACKLE BOX
Willard E. Fee, 1 W. Santa Inez Ave.,
San Mateo, Calif. 94402
Filed Mar. 5, 1965, Ser. No. 437,466
1 Claim. (Cl. 312—234.1)

ABSTRACT OF THE DISCLOSURE

A fishing tackle box having a panshaped compartmented body open at the top, separate hinged covers for the compartments. The covers carry opposed hinge pins journalled in bushings. A permanent magnet is mounted on the inner surface of one wall of each compartment and a plated steel block is carried by each cover coacting with the magnet to hold the cover closed. The cover is held on the pins by a bushing and a coil spring in the bushing. A name plate is embedded in each compartment cover.

---

The present invention relates generally to containers for fish hooks and more particularly to boxes for fly hooks.

In order to avoid damage to the delicate portions of fly hooks, it is necessary to support the hooks in a container in a manner to avoid crushing and distorting the delicate portions of the flies. It is also desirable to support the flyhooks so that there is no tendency to distort or break the hooks.

Furthermore, because of the large assortment of flyhook patterns usually carried by a fisherman, it is difficult to know all of such fly patterns.

Therefore, it is an object of the present invention to provide a light weight, inexpensive compartmented box for carrying wet or dry flies so that neither the hooks, nor the delicate structure of the flies will be damaged and which is especially adapted for carrying a large number of flies within a relatively small space so that access may be readily had thereto for selection as desired.

Another object of the invention is to provide a box for fly hooks of different types with visual means of identification and selection of the flies of each type.

A further object of the invention is to provide a compartmented fly box with individual removable covers for the compartments, the covers carrying identifying means for identifying the types of flies in the compartments.

Still another object of the invention is to provide a box with a cover lined with lambs wool, the wool permitting a hook to be inserted therein with the delicate portions of the fly out of contact with the cover or other hooks.

Another object according to a modified form of the invention is to provide a fly box having a number of drawers divided into compartments for storing flies of various types, the compartments having covers with means for identifying the types of flies in the compartments.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a top perspective view of a fly box embodying one form of the invention, the cover being shown in open condition, with flies shown supported thereon, FIG. 2 is a top plan view thereof, on a larger scale, one cover being shown in closed position, another cover being shown partially open, FIG. 3 is a cross-section view taken on the line 3—3 of FIG. 2, FIG. 4 is a perspective disassembled view of a compartment of the box showing the cover removed and showing in phantom lines a step in the assembling of the cover, parts being shown broken away, on an enlarged scale.

FIG. 5 is a cross-sectional view taken on the line 5—5 of FIG. 4,

FIG. 6 is an enlarged sectional view taken on the line 6—6 of FIG. 4,

FIGS. 7, 8, and 9 are detail views showing mounting of the cover on the top of the compartment, FIG. 10 is a front perspective view of a fly box embodying a modified form of the invention, and FIG. 11 is a front perspective view showing application of the boxes of FIGS. 1 and 10.

Referring now in detail to the various views of the drawings, in FIG. 1 a fly box embodying one form of the invention is shown and designated generally at 10. The fly box 10 is substantially rectangular in configuration and composed of suitable transparent plastic material. The box 10 comprises a pan-like body or housing 12 including end walls 14, 14, side walls 16 and 18 as well as a bottom 20. The body is open at the top and may be closed by a cover 22 hinged to side wall 18 at the top thereof by hinges 24. The body of the cover is inverted boxlike or pan-like with end flanges 26, 26 and side flanges 28 and 30. The interior of the body is lined with lambs wool 32.

The interior of the body 12 is divided by a wall 34 extending along the center of the interior thereof and by walls 36 extending across the interior of the body, into compartments 38, for receiving a plurality of flies 40. If the flies are of sufficiently small dimensions, a pair of them may be disposed with a single compartment 38, or only a single fly may be disposed within a single compartment if such fly is of sufficiently large dimension.

A hinged cover 42 is provided for each compartment 38. Each cover 42 comprises a thick transparent plastic plate-like rectangular-shaped body 44 with flat top and bottom surfaces as best seen in FIG. 4. At one end, the body of the cover is formed with an outer slanting edge portion 46 and with a transverse tubular passage 48 midway between the top and bottom surfaces of the body as viewed in FIG. 4. A metal bushing 50 is mounted in the passage 48, and housed in the bushing there is a compression coil spring 52 extending substantially the length of the bushing. Midway the ends of the bushing, the body thereof is formed with an annular crease 54 projecting inwardly of the interior of the bushing adapted to engage the convolutions of the compression spring 52, midway the ends of the spring. At the other end of the body 44, an integral enlargement is formed on the top surface thereof at its center constituting a handle 56.

Embedded in the center of the body 44, there is a duplicate fly hook indicated at 58. A narrow rectangular metal plate 60 is embedded in the top surface of the body 44 between the duplicate fly hook 40 and the slanting end edge 46 thereof with the name of the type of fly thereon, for example, "McGinity" as indicated at 62.

Embedded in the end opposite the slanting end edge, there is a block of plated steel 64, the outer surface and the bottom surface of the block being exposed. The body of the cover is hingedly mounted at one end to the adjacent partition walls 36 by means of aligned hinge pins 66 extending through recessed portions 68 in the walls 36 adjacent one end thereof, and by aligned pins 70 in the end walls 14, 14. The ends of the bushing 50 are removably mounted on the inwardly protruding ends of the hinge pins. The method of mounting the bushing on the hinge pins is shown in FIGS. 7 to 9, inclusive, wherein it will be seen that the body of the cover is disposed in a vertical plane with the bushing end thereof lowermost and initially one end of the bushing, for example, the right hand end as seen in FIG. 7 is inserted onto the right hand hinge pin 66 and then the body is slid onto said hinge pin against the action of spring 52 until the left hand side of the body of the cover clears the protruding end of the hinge pin 66 on the left hand side as seen in FIG. 8, whereupon the body is moved laterally to the left onto the left hand hinge pin as seen in FIG. 9. By reason of this mounting, the cover may be swung upward 90° as seen in phantom hinges in FIG. 6 to open the compartment, and is held on the hinge pins by means of the spring 52 which impinges against both pins. The spring prevents displacement of the cover.

In order to remove the cover 42, a reverse operation is necessary, that is, the cover is raised to an upright position such as shown in phantom lines in FIG. 4, the bottom end of the cover is slid on the adjacent pin 66 into the adjacent recess 68 against the action of spring 52 so as to carry the other side of the cover off of the opposed pin 66 whereby the cover may be tilted and lifted out of the compartment.

When the cover 42 is in closed condition as shown in full lines in FIG. 6, the steel plate 64 seats on the top surface of a metal block constituting a permanent magnet 72 embedded in the adjacent partition wall 34 or front wall 16 adjacent the top thereof by means of a flange 74 thereon, a portion of the block protruding inwardly of the interior of the compartment forming a seat for the cover. The permanent magnet 72 holds the cover against accidental displacement.

The above-described fly box 10 provides a convenient means for storing a supply of fishing fly hooks, lures and the like which will positively be prevented from entanglement with each other and will be readily accessible by merely lifting the cover 42 off of the compartment. The partition walls and cover will prevent entanglement between the flies and lures and will not allow them to become intermixed no matter what condition the fly box may assume. The compartments are sufficiently deep so that the flyhooks are not engaged by the cover 42.

The resiliency of the lambs wool 32 on the inside of the cover 22 permits a surplus supply of flyhooks 40 to be conveniently supported. Wet flies may be stored in some compartments 38 and dry flies in others.

It will be seen that by merely inspecting the covers 42, the types of flyhooks in the various compartments 38 will be readily identified by means of the duplicate flies 58 embedded in the covers 42 thereof and the name of the type in the compartment appears on the cover so that by merely raising the cover 42 by means of the handle 56 the desired name and type of flyhook is readily available.

With particular reference to FIG. 10, the invention also contemplates an improved box 10' for storing a supply of different types of named flyhooks or lures for supplying the flyhook box 10 with flyhooks. This box 10' is shown in FIG. 11 alongside of box 10 to show its application. The storage box 10' is preferably larger than the box 10 and comprises a rectangular boxlike body 12' having end walls 14', 14' and side walls 16' and 18', a bottom wall 20' and is open at the top. The open top is adapted to be closed by a cover 22' of inverted pan-like shape having end flanges 26', 26', and side flanges 28' and 30'. The cover is hinged to the top edge of the side wall 18' by hinges 24'. The front wall 16' is formed with a series of rectangular shaped openings 80 to accommodate slidable drawers 82 which ride on side rails, not shown. Each drawer 82 is divided by longitudinally disposed partition walls 34' and by transversely disposed partition walls 36' into compartments 38'. The drawers are provided with knobs 84 serving as handles. The compartments 38' are provided with removable covers 42' similar to covers 42. A false bottom 86 above the drawers along with the side walls 14', side walls 16' and side wall 18' defines a compartment 88 for surplus flyhooks and lures. The compartment is closed at the top by a removable closure plate 90 provided with a notch 92 along its front long edge to permit the finger of the operator to be inserted for lifting the closure plate off of the compartment.

Referring to FIG. 11, in use, the compartments 38 in flyhook box 10 may be filled from the supply of flyhooks in the compartments 38' in the storage box 10' and the cover 42' for the compartment 38' storing the particular type placed in compartment 38 may be transferred from the storage box 10' to the flybox 10 as shown by the arrows in FIG. 11.

It will be apparent that the magnet or magnet assembly including the permanent magnet 72 is so constructed that the plates 64 on the edges of the covers 42 are uniformly magnetized so that the magnets will uniformly hold all of the covers in position against displacement.

In the use of box 10, the user when he desires to change a flyhook may readily observe the duplicate fly 58 of the type of flyhook in the particular compartment 38 and select the fly he desires to next use, and then may easily lift the cover 42 off of the compartment and lift the fly out of the compartment, and interchange the cover 42 with the embedded duplicate fly 58 he desires from the storage box 10' to the flybox 10, returning to the storage box 10' the cover 42 and fly 40 he does not want from the flybox 10.

While I have illustrated and described the preferred embodiments of my invention, it is to be understood that I do not limit myself to the precise constructions herein disclosed and that various changes and modifications may be made within the scope of the invention as defined in the appended claim.

Having thus described the invention, what I claim as new, and desire to secure by United States Letters Patent is:

In a flyhook box, a pan-shaped body open at the top, said body divided into a number of compartments with open tops for holding flyhooks therein, said compartments having bottom, end and side walls, plastic plate-like openable covers hingedly mounted on the side walls of said compartments at the tops thereof, said mounting including opposed hinge pins on said side walls at one end of each compartment adjacent the top thereof, a tubular bushing carried by each said plate-like cover at one end thereof journalled on said hinge pins, a permanent magnet supported on the inner surface of one end wall of each compartment, a plated steel block carried by said plate-like cover at one end thereof adapted to contact said permanent magnet when the plate-like cover is in closed condition, a name plate embedded in the cover of each compartment at one end thereof identifying the name of the type of flyhook in the compartment, and an elongated compression coil spring in said bushing contacting the opposed hinge pins for holding the plate-like cover in position on the pins.

References Cited

UNITED STATES PATENTS

| | | | |
|---|---|---|---|
| 1,926,162 | 9/1933 | Moberly | 217—7 |
| 2,308,284 | 1/1943 | Ibach | 206—1 |
| 2,625,261 | 1/1953 | Swift | 206—38 |
| 2,724,208 | 11/1955 | Nelson | 43—57.5 |
| 2,853,709 | 9/1958 | Peterson et al. | 2—51 |
| 3,152,716 | 10/1964 | Feldhahn | 220—31 |

SAMUEL KOREN, *Primary Examiner.*

HUGH R. CHAMBLEE, *Examiner.*